US006631225B2

(12) United States Patent
Lee et al.

(10) Patent No.: US 6,631,225 B2
(45) Date of Patent: Oct. 7, 2003

(54) MODE COUPLER BETWEEN LOW INDEX DIFFERENCE WAVEGUIDE AND HIGH INDEX DIFFERENCE WAVEGUIDE

(75) Inventors: Kevin K. Lee, Cambridge, MA (US); Kazumi Wada, Lexington, MA (US); Desmond Lim, Cambridge, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 76 days.

(21) Appl. No.: 09/841,464

(22) Filed: Apr. 24, 2001

(65) Prior Publication Data
US 2002/0031296 A1 Mar. 14, 2002

Related U.S. Application Data
(60) Provisional application No. 60/217,168, filed on Jul. 10, 2000.

(51) Int. Cl.[7] ............................. G02B 6/26; G02B 6/42
(52) U.S. Cl. ........................... 385/28; 385/43; 385/49; 385/50
(58) Field of Search ................................ 385/27–28, 43

(56) References Cited
U.S. PATENT DOCUMENTS

| 5,056,888 A | * | 10/1991 | Messerly et al. | ........... 385/123 |
| 5,199,092 A | | 3/1993 | Stegmueller | ................. 385/50 |
| 5,208,800 A | * | 5/1993 | Isobe et al. | .................... 385/28 |
| 6,396,984 B1 | * | 5/2002 | Cho et al. | ...................... 385/43 |

OTHER PUBLICATIONS

Schwander, Th. et al. "Simple and low–loss fibre–to–chip coupling by integrated field–matching waveguide in InP." Electronics Letters, vol. 29, No. 4, (1993), 326–8.*

Zengerle et al. "Laterally tapered InP—InGaAsP waveguides for low–loss chip–to–fiber butt coupling: a comparison of different configurations." IEEE Photonics Technology Letters, vol. 7, No. 5, (1995), 532–4.*

"A Review on Fabrication Technologies For The Monolithic Integration of Tapers with III–V Semiconductor Devices" by Moerman et al., IEEE Journal of Selected Topics In Quantum Electronics, vol. 3, No. 6, Dec. 1997, pp: 1308–1320.

"Laterally Tapered InP–InGaAsP Waveguides for Low–Loss Chip–to–Fiber Butt Coupling: A Comparison of Different Configuration", by Zengerle et al., IEEE Photonics Technology Letters, vol. 7, No. 5, May 1995, pp. 532–534.

"Simple and Low–Loss Fibre–To–Chip Coupling By Integrated Field–Matching Waveguide In InP", by Schwander et al., Electronics Letters Feb. 18, 1993, vol. 29, No. 4, pp. 326–328.

"Integrated Optical Modeshape Adapters in InGaAsP/InP for Efficient Fiber–to–Waveguide Coupling"; T. Brenner and H. Melchior; IEEE Photonics Technology Letters, vol. 5, No. 9, Sep. 1993; pp. 1053–1056.

* cited by examiner

*Primary Examiner*—Robert H. Kim
*Assistant Examiner*—Thomas R Artman
(74) *Attorney, Agent, or Firm*—Samuels, Gauthier & Stevens, LLP

(57) ABSTRACT

A mode coupler that enables low-loss coupling between optical modes of two waveguides with different index difference. The mode size and the effective index are gradually changed between two waveguides to gradually transform the mode shape, size, and speed with minimum power loss. The mode coupler is useful for coupling the mode of an optical fiber waveguide with low index difference to the mode of a planar high index difference waveguide, and vice versa.

42 Claims, 1 Drawing Sheet

MODE COUPLER BETWEEN LOW INDEX DIFFERENCE WAVEGUIDE AND HIGH INDEX DIFFERENCE WAVEGUIDE

PRIORITY INFORMATION

This application claims priority from provisional application Ser. No. 60/217,168 filed Jul. 10, 2000.

BACKGROUND OF THE INVENTION

1. Field of the Invention

The present invention is in the field of optics, specifically in optical couplers for bi-directionally coupling optical radiation between two waveguides. It is also in the field of mode transformer between two waveguides.

2. Prior Art

The mode coupler between two different waveguides is an essential part of an optical system where the lightwave (mode) from one optical component is coupled into another component. In optical communication, the mode coupler between an optical fiber waveguide and a high index difference (difference in the refractive indices of core and cladding) planar waveguide is crucial for successful implementation of integrated optics in fiber communication. Therefore, developing an efficient mode coupling between two waveguides has been the subject of intense research.

When coupling the modes between two waveguides with different index differences and/or core indices, high coupling loss arises due to the difference in the mode size, shape, and mode velocity. For example, the index difference, and the mode of a fiber optic waveguide are different from those of a high index difference planar waveguide, resulting in a high coupling loss when the fiber optic waveguide and the high index difference planar waveguide are coupled directly. The index difference of a fiber is smaller than that of high index difference waveguides, making the fiber mode larger than the waveguide mode. In addition, the core index of the fiber optic waveguide is lower than that of the high index difference planar waveguide causing a mode velocity difference between two waveguides. When such a change in mode properties takes place too quickly, high power loss arises.

There have been several approaches to achieve efficient mode coupling between two waveguides with different index difference, including mode transformation by tapering the dimension of high index difference waveguide. Mode transformation by a taper has been shown in various publications. Over the tapering region of the high index difference waveguide, the thickness of the waveguide core is gradually tapered down from that of the normal guiding region to 0 thickness. As the mode travels from the normal guiding region of the high index difference waveguide into the tapering region, the mode experiences decreasing amount of the core material. The fraction of the mode field distribution that exists outside the core material increases, changing the mode size. The index of the waveguide that the mode experiences is effectively changed by the presence of the taper. In other words, the "effective index" is gradually changed by the taper. By gradually changing the effective index from that of the low index difference waveguide to that of the high index difference waveguide, the mode coupling can be achieved between two waveguides without high loss.

Mode transformation based on tapering is shown in the prior art including IEEE Photonics Technology Letters, Vol. 5, No.9, September 1993 by Brenner et al. In this publication, the core of the planar waveguide is vertically tapered down from that of the regular waveguide. The mode size propagating in the tapered region increases due to the reduction of the effective index, and thus the reduction of the effective index difference. This publication shows the gradual mode transformation occurring in one waveguide due to the presence of a taper.

U.S. Pat. No. 5,199,092, issued to Stegmueller et al. shows the coupling of modes between two different waveguides: one broad and one narrow. The two waveguides run parallel to one another and are superimposed with each other to provide a superimposing waveguide guidance. During the superimposed waveguide guidance, one of the two waveguides is tapered down in vertical dimension, while the other waveguide dimension is kept constant. The role of the tapered waveguide is to provide a gradual effective index change, and thus mode transformation, same as the cases in journal publications including that by Brenner et al. The only difference of this technology from the technologies available in publications is the superimposition of the narrow waveguide in the broad waveguide, providing waveguiding in the broad waveguide once the narrow waveguide is completely terminated by the vertical taper. The broad waveguide is surrounding the narrow waveguide over the whole waveguiding distance. The presence of the broad waveguide helps guiding the mode once the mode transformation is complete.

SUMMARY OF THE INVENTION

In accordance with the invention, using a dual-taper, achieves low-loss mode coupling between two waveguides having different index differences, core indices, and dimensions. This apparatus can be used to couple the optical mode from an optical fiber, whose typical single-mode dimension of the core is approximately 10 $\mu$m in diameter, to the mode in a high index difference planar waveguide, whose single-mode dimension of the core is less than that of an optical fiber.

It is an objective of the invention to provide a device for transforming the mode between two waveguides with different mode sizes and indices. It is another objective of the invention to provide a device to enable low-loss coupling between the optical fiber waveguide mode and the high index difference planar waveguide mode.

In the invention, the mode undergoes a low-loss transformation between a low index difference waveguide and a high index difference waveguide by traveling through the coupling region containing a dual-taper. The dual-taper provides a gradual change in the mode properties necessary for low-loss, bi-directional mode transformation. Both the low index difference and high index difference waveguides are tapered, in opposite directions. These two oppositely running tapers are placed so that there is an overlap of two waveguides, with the smaller waveguide embedded in the larger waveguide.

It is an objective of the invention to show that the dual-taper structure enhances mode transformation efficiency between two waveguides. It is another objective of the invention to demonstrate the two tapered waveguides should be overlapped, or in contact, for low-loss mode transformation.

To apply the invention for coupling the modes between an optical fiber and a high index difference waveguide, the low index difference waveguide can be chosen to have similar index difference, core index, and mode size as an optical fiber. The mode from the fiber is initially coupled to the low index difference waveguide having similar properties. Therefore the coupling is achieved with low loss due to the similarity of the modes. Once coupled, light is guided in the low index difference waveguide. Then the mode and the effective index of the low index difference waveguide are gradually changed to that of the final waveguide by the dual-taper.

DETAILED DESCRIPTION OF THE INVENTION

Figure 1:
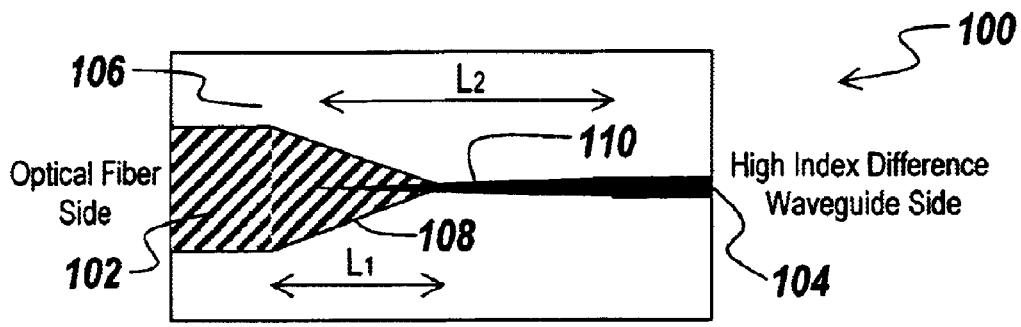
FIG. 1 is a top view of simplified schematic diagram of an exemplary embodiment of a mode coupler in accordance with the invention.
Figure 2:
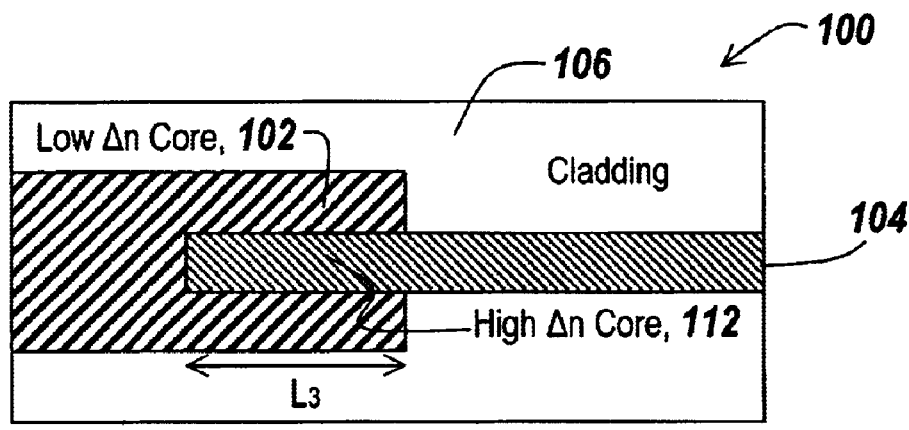
FIG. 2 is a side view of the mode coupler shown in FIG. 1. Δn is index difference.
Figure 3:
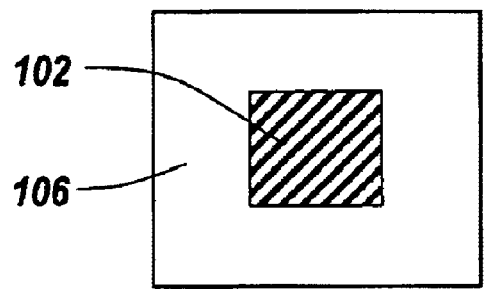
FIG. 3 is frontal view from the left side of the mode coupler shown in FIG. 1.
Figure 4:
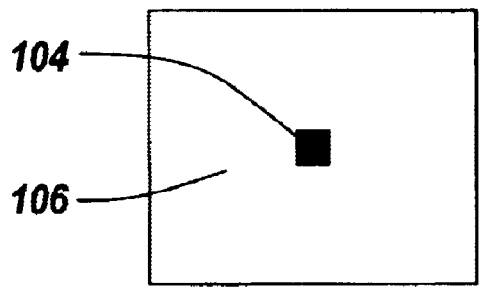
FIG. 4 is a frontal view from the right side of the mode coupler shown in FIG. 1.

FIGS. 1–4 are simplified schematic diagrams of an exemplary embodiment of a mode coupler 100 in accordance with the invention. FIG. 1 shows a top view of the mode coupler 100, while FIG. 2 shows a side view of the same coupler. FIGS. 3 and 4 show frontal views from the left and right side, respectively, of the coupler shown in FIG. 1.

The mode coupler includes a core 102 of a low index difference waveguide, a core 104 of a high index difference waveguide, and cladding 106 surrounding both cores to define the low index difference waveguide, which forms a large mode, and high index difference waveguide, which forms a small mode.

A tapered region 108 of length $L_1$ is provided in the low index difference waveguide. A tapered region 110 of length $L_2$ is provided in the high index difference waveguide. Each of the tapered regions 108, 110 are configured to overlap so that a portion 112, of length $L_3$, of the tapered region 110 is embedded within the tapered region 108.

The index of the core 104, $n_2$ is larger than $n_1$ and $n_3$, the indices of the core 102 and the cladding 106. In the illustrated exemplary embodiment, $n_1$ is slightly larger than $n_3$. The low index difference waveguide is defined by the core 102 and cladding 106 as seen in FIG. 3, since $n_1$ is only slightly larger than $n_3$:

$$0 < \frac{n_1 - n_3}{n_3} << 1.$$

On the other hand, the high index difference waveguide is defined by the core 104 and cladding 106 as seen in FIG. 4, since $n_2$ is much larger than $n_3$:

$$0 < \frac{n_1 - n_3}{n_3} < \frac{n_2 - n_3}{n_3}.$$

The fiber mode, whose cross-sectional dimension is similar to that shown in FIG. 3, is coupled to the left side of the mode coupler 100 as shown in FIGS. 1 and 2 when the mode coupler is used to couple fiber to a high index difference waveguide.

In operation, the mode traveling from left to right in the mode coupler 100 as shown in FIG. 1 will be transformed from that of the low index difference waveguide, whose core/cladding indices are $n_1/n_3$, to that of the high index difference waveguide, whose core/cladding indices are $n_2/n_3$.

The mode entering the mode coupler on the left side of FIG. 1 is determined by the waveguide cross-section shown in FIG. 3. The optical mode is guided by the low index difference waveguide, preserving the mode characteristics until the taper 108 in the high index core 104 is introduced, as shown in FIG. 1. In taper 108, the core 104 is horizontally tapered to gradually change the effective index from that of the waveguide mode in the low index waveguide. When the core 104 is narrow in taper 108, the effective index is close to that of the core 102 (and the cladding 106), thus the mode properties are similar. As the core 104 is gradually widened, the effective index increases accordingly, approaching that of the high index difference waveguide. The mode gradually transforms into a mode in the waveguide cross-section shown in FIG. 4 by the change of the effective index.

The core 102 is tapered in the opposite direction from the core 104, as seen in FIG. 1. This taper terminates the low index difference waveguide once the mode is coupled into high index difference waveguide. The taper also enhances the efficiency of mode transformation.

The tapered regions 108 and 110 on high index difference and low index difference waveguides provide an efficient, bi-directional mode coupler, since the tapers on the high index difference waveguide terminates the high index difference waveguide once the mode is coupled into low index difference waveguide, and vice versa. The mode coupler 100 works for modes traveling from right to left as well as from left to right as shown in FIGS. 1 and 2, making it a bi-directional mode coupler.

The taper length of the high index core should be designed to minimize mode transformation loss. The design of the taper in the low index core should be designed to minimize reflection, maximize focusing, and maximize efficiency. The overlap portion 112 of the tapered regions 108, 110, should also be chosen to maximize coupling efficiency.

The mode coupler of the invention is useful for coupling mode from an optical fiber to a high index difference waveguide. The fiber mode can be coupled on left side of the coupler as shown in FIG. 1, whose cross-sectional view is shown in FIG. 3. The index difference between the core 102 and cladding 106 can be chosen to be similar to that of fiber (~0.01). The core/cladding indices and thus the mode are similar to that of fiber, resulting in a highly efficient coupling. Once coupled, the mode will be transformed into that of a high index difference waveguide as described above.

This coupling technology can be applied to any high index difference waveguide systems. For example, one can use $SiO_2$ as the cladding, SiON as the low index difference waveguide core, and $Si_3N_4$ as the high index difference waveguide core. For the illustrated exemplary embodiment, the design parameters of $L_1=L_2=50$ μm and $L_3=40$ μm gave a simulated values of 75% efficiency at the wavelength of 1.55 μm. This is an improvement over 30% efficiency for the case of butt-coupling without a dual-taper. The invention is a bi-directional coupler which shows similar efficiencies for mode coupling in both directions.

While exemplary embodiments of the invention have been illustrated with continuous or linear (flat edged) tapers, it will be appreciated that segmented or non-linear tapers can also be utilized in accordance with the invention. For example, the taper can have a stepped taper edge, or a concave or convex shaped taper edge.

Although the present invention has been shown and described with respect to several preferred embodiments thereof, various changes, omissions and additions to the form and detail thereof, may be made therein, without departing from the spirit and scope of the invention.

What is claimed is:

1. An optical mode coupler comprising:
   a first core having a first tapered region;
   a second core having a second tapered region, a portion of said second tapered region being in embedded within said first tapered region; and
   a cladding surrounding said first and second cores, said cladding comprising one or more materials with different refractive indices than those of said first and second cores.

2. The coupler of claim 1, wherein said tapered regions taper down towards one another.

3. The coupler of claim 1, wherein the index of refraction of said first core is relatively lower than the index of refraction of said second core.

4. The coupler of claim 1, wherein the index of refraction of said first core is slightly higher than the index of refraction of said cladding.

5. The coupler of claim 4, wherein $0<(n_1-n_3)/n_3<<1$, where $n_1$ is the refractive index of said first core and $n_3$ is the refractive index of said cladding.

6. The coupler of claim 1, wherein the index of refraction of said second core is substantially higher than the index of refraction of said first core and said cladding.

7. The coupler of claim 6, wherein $0<(n_1-n_3)/n_3<(n_2-n_3)/n_3$, where $n_1$ is the refractive index of said first core, $n_2$ is the refractive index of said second core, and $n_3$ is the refractive index of said cladding.

8. The coupler of claim 2, wherein the length of the embedded portion of said second tapered region is less than the length of each of said first and second tapered regions.

9. The coupler of claim 1, wherein a propagating optical mode is transformed in size, shape and speed as it propagates between said first core and said second core.

10. The coupler of claim 1, wherein a propagating optical mode can propagate bi-directionally between said first and second cores.

11. The coupler of claim 1, wherein a propagating optical mode can propagate bi-directionally between said first core surrounded by said cladding and said second core surrounded by said cladding.

12. The coupler of claim 1, wherein said second tapered region provides an effective refractive index change to a propagating optical mode.

13. The coupler of claim 1, wherein said first tapered region minimizes reflection of a propagating mode and focuses said propagating mode into said second core.

14. The coupler of claim 1, wherein said first tapered region enhances the efficiency of mode transformation of a propagating mode.

15. The coupler of claim 1, wherein said first and second tapered regions are continuous or linear.

16. The coupler of claim 1, wherein said first and second tapered regions are segmented or non-linear.

17. A dielectric waveguide optical mode transformer comprising:
   a first dielectric waveguide including a first core having a first tapered region and surrounded by a cladding; and
   a second dielectric waveguide including a second core having a second tapered region and surrounded by said cladding, a portion of said second tapered region being embedded within said first tapered region, wherein said cladding comprising one or more materials with different refractive indices than those of said first and second cores.

18. The transformer of claim 17, wherein said tapered regions taper down towards one another.

19. The transformer of claim 17, wherein the index of refraction of said first core is relatively lower than the index of refraction of said second core.

20. The transformer of claim 17, wherein the index of refraction of said first core is slightly higher than the index of refraction of said cladding.

21. The transformer of claim 20, wherein $0<(n_1-n_3)/n_3<<1$, where $n_1$ is the refractive index of said first core and $n_3$ is the refractive index of said cladding.

22. The transformer of claim 17, wherein the index of refraction of said second core is substantially higher than the index of refraction of said first core and said cladding.

23. The transformer of claim 22, wherein $0<(n_1-n_3)/n_3<(n_2-n_3)/n_3$, where $n_1$ is the refractive index of said first core, $n_2$ is the refractive index of said second core, and $n_3$ is the refractive index of said cladding.

24. The transformer of claim 17, wherein the length of the embedded portion of said second tapered region is less than the length of each of said first and second tapered regions.

25. The transformer of claim 17, wherein a propagating optical mode is transformed in size, shape and speed as it propagates between said first core and said second core.

26. The transformer of claim 17, wherein a propagating optical mode can propagate bi-directionally between said first and second cores.

27. The transformer of claim 17, wherein a propagating optical mode can propagate bi-directionally between said first and second waveguides.

28. The transformer of claim 17, wherein said second tapered region provides an effective refractive index change to a propagating optical mode.

29. The transformer of claim 17, wherein said first tapered region minimizes reflection of a propagating mode and focuses said propagating mode into said second core.

30. The transformer of claim 17, wherein said first tapered region enhances the efficiency of mode transformation of a propagating mode.

31. The transformer of claim 17, wherein said first and second tapered regions are continuous or linear.

32. The transformer of claim 17, wherein said first and second tapered regions are segmented or non-linear.

33. A method of bi-directionally coupling a propagating optical mode between optical regions comprising:
   providing a first core having a first tapered region;
   providing a second core having a second tapered region, a portion of said second tapered region being embedded within said first tapered region;
   providing a cladding that surrounds said first and second cores, said cladding comprising one or more materials with different refractive indices than those of said first and second cores; and
   introducing a propagating optical mode into either said first or second cores.

34. A method of hi-directionally coupling a propagating optical mode between optical regions comprising:
   providing a first core having a first tapered region;
   providing a second core having a second tapered region, a portion of said second tapered region being embedded within said first tapered region;
   providing a cladding that surrounds said first and second cores, said cladding comprising one or more materials with different refractive indices than those of said first and second cores; and
   introducing a propagating optical mode into either of said optical regions.

35. A method of hi-directionally coupling a propagating optical mode between a high refractive index region and a low refractive index region comprising:
- providing a first low index of refraction core having a first tapered region;
- providing a second high index of refraction core having a second tapered region, a portion of said second tapered region being embedded within said first tapered region;
- providing a cladding that surrounds said first and second cores, said cladding comprising one or more materials with different refractive indices than those of said first and second cores; and
- introducing a propagating optical mode into either said first or second cores.

36. A method of bi-directionally coupling a propagating optical mode between a high refractive index region and a low refractive index region comprising:
- providing a first low index of refraction core having a first tapered region;
- providing a second high index of refraction core having a second tapered region, a portion of said second tapered region being embedded within said first tapered region;
- providing a cladding that surrounds said first and second cores, said cladding comprising one or more materials with different refractive indices than those of said first and second cores; and
- introducing a propagating optical mode into either said high refractive index region or said low refractive index region.

37. An optical mode coupler comprising:
- a first core having a first tapered region;
- a second core having a second tapered region, a portion of said second tapered region being in embedded within said first core; and
- a cladding surrounding said first and second cores, said cladding comprising one or more materials with different refractive indices than those of said first and second cores.

38. A dielectric waveguide optical mode transformer comprising:
- a first dielectric waveguide including a first core having a first tapered region and surrounded by a cladding; and
- a second dielectric waveguide including a second core having a second tapered region and surrounded by said cladding, a portion of said second tapered region being embedded within said first dielectric waveguide, wherein said cladding comprising one or more materials with different refractive indices than those of said first and second cores.

39. A method of bi-directionally coupling a propagating optical mode between optical regions comprising:
- providing a first core having a first tapered region;
- providing a second core having a second tapered region, a portion of said second tapered region being embedded within said first core;
- providing a cladding that surrounds said first and second cores, said cladding comprising one or more materials with different refractive indices than those of said first and second cores; and
- introducing a propagating optical mode into either said first or second cores.

40. A method of bi-directionally coupling a propagating optical mode between optical regions comprising:
- providing a first core having a first tapered region;
- providing a second core having a second tapered region, a portion of said second tapered region being embedded within said first core;
- providing a cladding that surrounds said first and second cores, said cladding comprising one or more materials with different refractive indices than those of said first and second cores; and
- introducing a propagating optical mode into either of said optical regions.

41. A method of bi-directionally coupling a propagating optical mode between a high refractive index region and a low refractive index region comprising:
- providing a first low index of refraction core having a first tapered region;
- providing a second high index of refraction core having a second tapered region, a portion of said second tapered region being embedded within said first low index of refraction core;
- providing a cladding that surrounds said first and second cores, said cladding comprising one or more materials with different refractive indices than those of said first and second cores; and
- introducing a propagating optical mode into either said first or second cores.

42. A method of bi-directionally coupling a propagating optical mode between a high refractive index region and a low refractive index region comprising:
- providing a first low index of refraction core having a first tapered region;
- providing a second high index of refraction core having a second tapered region, a portion of said second tapered region being embedded within said first low index of refraction core;
- providing a cladding that surrounds said first and second cores, said cladding comprising one or more materials with different refractive indices than those of said first and second cores; and
- introducing a propagating optical mode into either said high refractive index region or said low refractive index region.

* * * * *